United States Patent
Ichinose et al.

(10) Patent No.: US 10,450,788 B2
(45) Date of Patent: Oct. 22, 2019

(54) VEHICLE DOOR CONTROL SYSTEM

(71) Applicant: Mitsui Kinzoku Act Corporation, Yokohama-shi (JP)

(72) Inventors: Mikio Ichinose, Yokohama (JP); Hiroki Hattori, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 59 days.

(21) Appl. No.: 15/456,748

(22) Filed: Mar. 13, 2017

(65) Prior Publication Data

US 2017/0268278 A1 Sep. 21, 2017

(30) Foreign Application Priority Data

Mar. 17, 2016 (JP) .................. 2016-053238

(51) Int. Cl.
| | |
|---|---|
| *E05F 15/611* | (2015.01) |
| *E05F 15/40* | (2015.01) |
| *E05F 15/74* | (2015.01) |
| *B60R 25/24* | (2013.01) |
| *B60R 16/037* | (2006.01) |
| *B60R 25/20* | (2013.01) |

(52) U.S. Cl.
CPC .......... *E05F 15/611* (2015.01); *B60R 16/037* (2013.01); *B60R 25/24* (2013.01); *E05F 15/40* (2015.01); *E05F 15/74* (2015.01); *B60R 25/20* (2013.01)

(58) Field of Classification Search
None
See application file for complete search history.

(56) References Cited

U.S. PATENT DOCUMENTS

| | | | | |
|---|---|---|---|---|
| 8,909,422 | B2* | 12/2014 | Morimoto | B61D 37/00 701/36 |
| 9,650,824 | B2* | 5/2017 | Sauerwein | E05F 5/00 |
| 10,006,239 | B2* | 6/2018 | Disley | E05F 15/60 |
| 2013/0289829 | A1* | 10/2013 | Ho | B60K 37/06 701/48 |
| 2016/0357262 | A1* | 12/2016 | Ansari | G06F 3/017 |
| 2017/0089114 | A1* | 3/2017 | Rider | E05F 15/40 |
| 2017/0103592 | A1* | 4/2017 | Buttolo | G07C 9/00015 |
| 2017/0218678 | A1* | 8/2017 | Kothari | E05F 15/73 |

FOREIGN PATENT DOCUMENTS

| | | |
|---|---|---|
| JP | 2002-505219 A | 2/2002 |
| JP | 2008-208639 A | 9/2008 |
| JP | 2016-016813 | 2/2016 |
| WO | WO 99/06987 | 2/1999 |

* cited by examiner

*Primary Examiner* — Catherine A Kelly

(57) ABSTRACT

A vehicle door control system comprises a door that is supported to a vehicle body; an electric door opening device that can open and close the door electrically; a touch panel display that can display an image like the door; a loudspeaker that can create a voice; and a control device that controls the electric door opening device. The control device performs opening control by which the electric door opening device opens the door by touching an image on the touch panel display and performs voice control by which it is reported through the voice from the loudspeaker that the door opens.

2 Claims, 8 Drawing Sheets

VEHICLE DOOR CONTROL SYSTEM

BACKGROUND OF THE INVENTION

The present invention relates to a vehicle door control system with a touch panel display.

Vehicles comprise opening/closing members such as a plurality of doors, a trunk lid and a window glass in each of the doors. In the doors, in order to enhance vehicle accesibility of passengers, it is suggested to provide a vehicle control system for a vehicle door in which an electric door opening device with a power source such as a motor is driven to open and close a selected door electrically.

For example, in a vehicle door control system in JP2016-16813A, a vehicle door image on a touch panel display is selected by touching, and a touched finger slides to open and close a door. An electric door opening device is actuated to open or close the door, so that the door selected by the touch panel display is opened or closed.

In the vehicle door control system in JP2016-16813A, a user who operates the touch panel display is a driver at a driver's seat, and the operated door is a rear door. The operated door is behind the user, and if the touch panel display is operated to open the door without making sure backward, the rear door will be opened unexpectedly, so that a passenger at a rear seat is likely to get uncomfortable.

SUMMARY OF THE INVENTION

In view of the disadvantage, it is an object of the present invention to provide a vehicle door control system by which a door is safely opened by touching a touch panel display.

DETAILED DESCRIPTION OF PREFERRED EMBODIMENT

One embodiment of the present invention will be described with respect to drawings.

Figure 1:
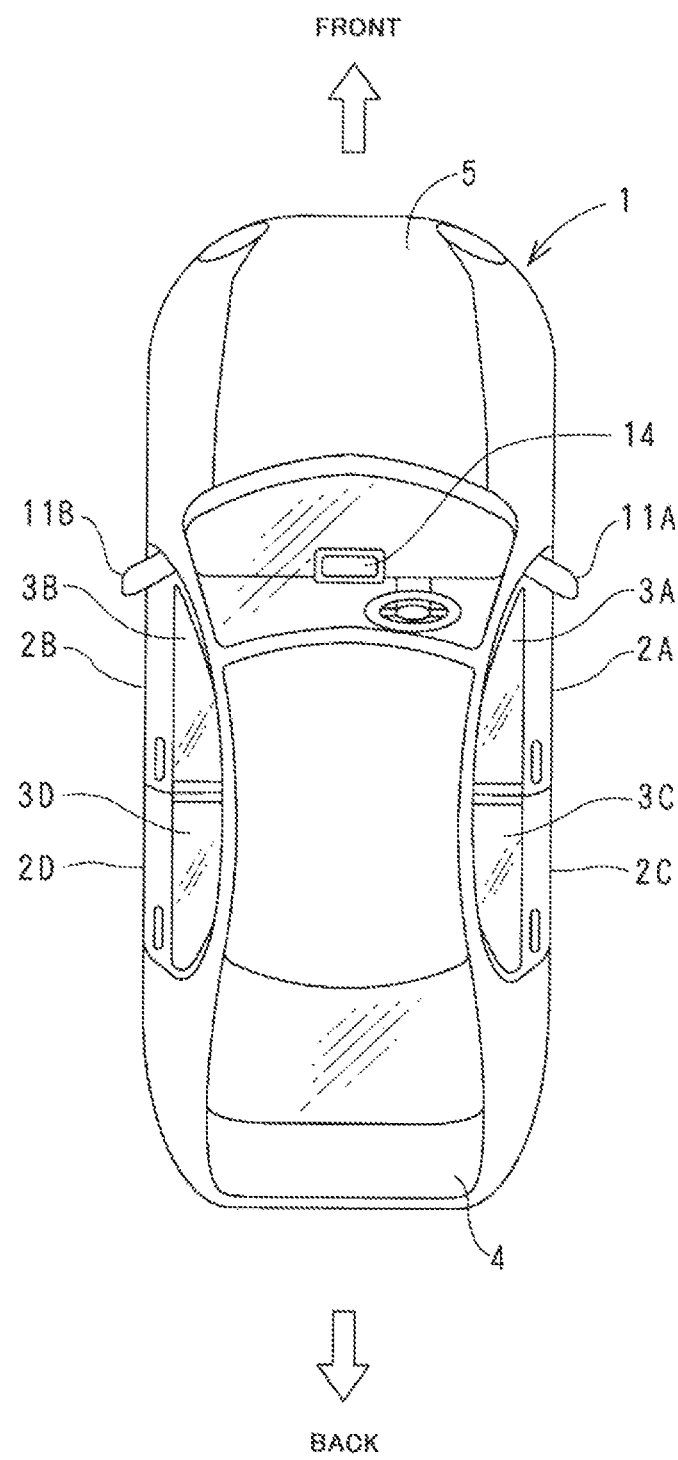
FIG. 1 is a top plan view of a vehicle in which the present invention is applied.
Figure 2:
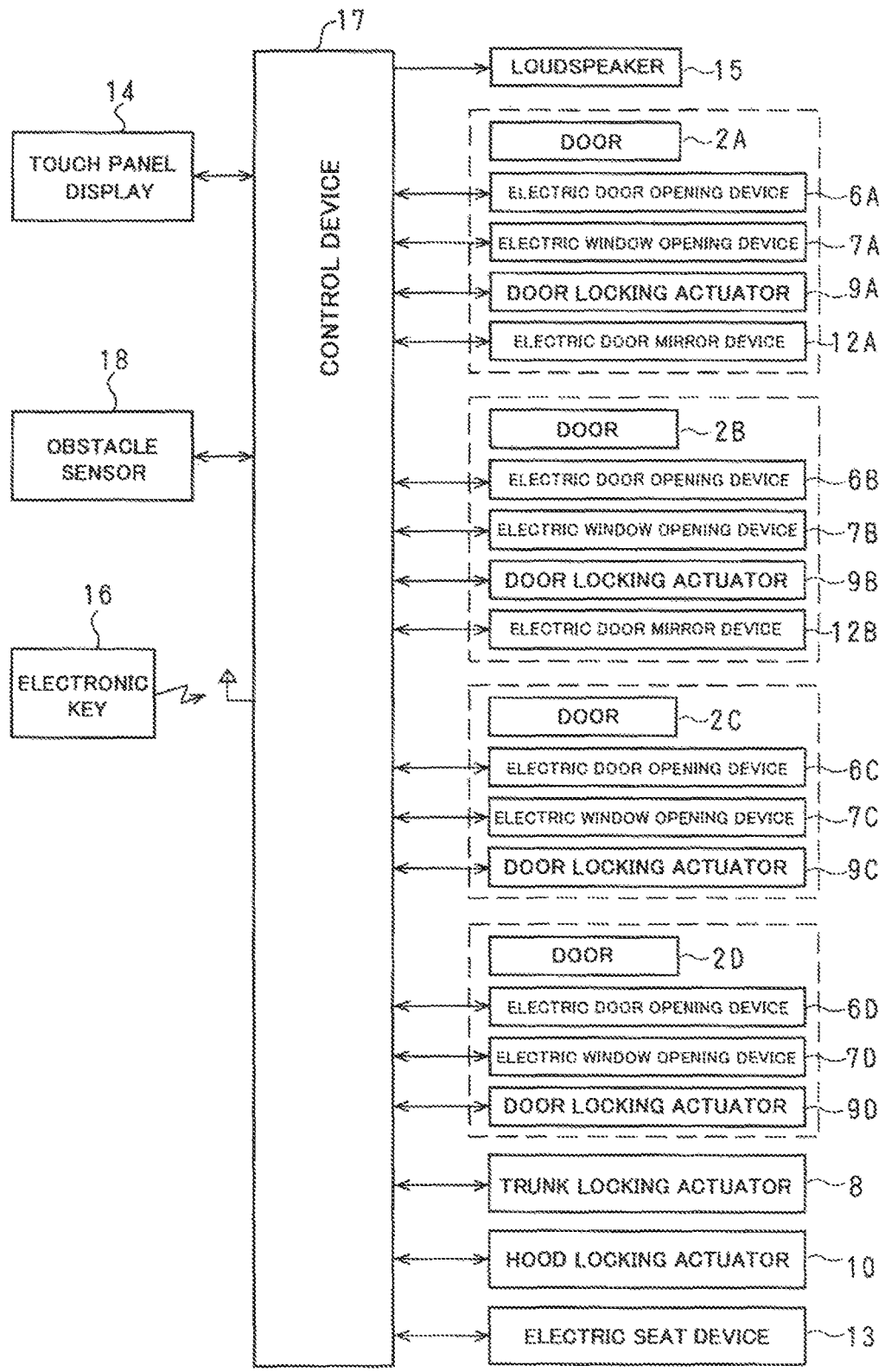
FIG. 2 is a block diagram of a control circuit.

In FIG. 1, a vehicle 1 in this embodiment comprises, as opening members, front doors 2A, 2B and rear doors 2C, 2D pivotally attached on door hinges (not shown) with vertical shafts at the sides of a vehicle body to open and close; window glasses 3A-3D that open and close in the doors 2A-2D respectively; a trunk lid 4 that opens and closes a trunk; and a hood 5 that opens and closes an engine compartment.

In FIG. 1, the vehicle 1 further comprises electric opening devices 8A-6D that open and close the doors 2A-2D electrically; electric window-opening devices 7A-7D that vertically open and close the window glasses 3A-3D electrically, a trunk-locking actuator 8 that enables the trunk lid 4 to open by releasing a trunk lock (not shown) for holding the trunk lid 4 closed; door locking actuators 9A-9D that turns on/off a door Sock (not shown) for holding the doors 2A-2D closed, to an unlock state or a lock state; a hood locking actuator 10 that enables the hood 5 to open by releasing a hood lock (not shown) that holds the hood 5 closed; electric door mirror devices 12A, 12B that switch door mirrors 11A, 11B (in FIG. 1) attached to the doors 2A, 2B, to an upright state in use or a folded state in storage; and an electric seat device 13 that changes a position of an interior seat (not shown) electrically.

An interior instrument panel comprises a touch-panel display 14 that enables touch operation on a screen such as a liquid-crystal display; and a loudspeaker 15 that can tell you of information on the touch-panel display 14 phonetically. On the vehicle body, there is installed a control device 17 that controls the electric devices and the loudspeaker 15 with a portable electronic key 16 and various switches. The touch panel display 14 is used as display and input means for a navigation device (not shown) installed in the vehicle 1 and input means for images like the opening members and for the electric devices.

In the electric, devices for the opening members, such as the electric opening devices 6A-8D, electric window opening devices 7A-7D and electric seat device 13, a rotation angle sensor (not shown) or a rotary encoder for detecting a rotation angle of a rotating part are installed. A fully-closing detecting sensor (not shown) that detects each of the opening members fully closed is disposed in the opening members such as the doors 2A-2D, trunk lid 4 and hood 5 on the vehicle body opposite the doors.

Obstacle sensors 18 are attached on the doors 2A-2D or on the side of the vehicle body. The obstacle sensor 18 is, for example, a noncontact sensor, an infrared laser sensor that enables a distance to be measured, a motion sensor that detects a motion or an image sensor that recognizes with an image so as to detect an obstacle that prevents each of the doors 2A-2D from opening when each of the doors 2A-2D opens.

The control device 17 comprises microcontrollers, and into input ports thereof, signals that include wireless signals transmitted from the touch panel display 14, electronic key 16, obstacle sensor 14, angular sensors in the electric devices and fully-closing sensor are fed. To output ports, the electric devices such as the electric door openings devices 6A-6D, electric window opening devices 7A-7D, trunk-locking actuator 8, door-locking actuators 9A-9D, hood-locking actuator 10, electric door mirror devices 12A, 12D and electric seat device 13, and the loudspeaker 15 are electrically connected respectively. Thus, the control device 17 controls the electric devices and the loudspeaker 15 according to each signal supplied when the touch panel display 14 is touched, which will be described In detail later.

When an ID signal is authenticated through a wireless communication with the electronic key 18, the control device 17 receives a locking/unlocking signal from the electronic key 18 and controls locking/unlocking of the door locking actuators 9A-9D, which do not directly relate to the present invention and is not described in detail.

The touch panel display 14 can be switched from a map information of the navigation device to an electric device operation picture used as operating means for operating the electric device and vice versa, and by touching the display screen, a coordinate signal corresponding to a touched position is transmitted to the control device 17.

Figure 3:
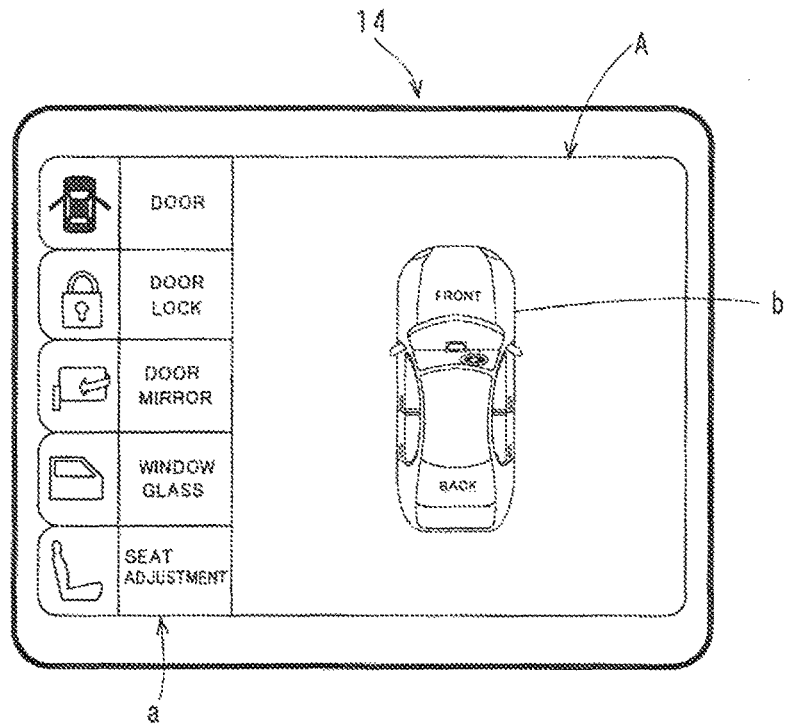
FIG. 3 is an initial picture A on a touch panel display.

As an electric device operating picture displayed on the touch panel display 14, there are an initial picture A in FIG. 3 selecting an object to be operated and operating object pictures B1-B8 displaying the object selected on the initial picture A.

The initial picture A in FIG. 3 is touched at a predetermined position on the screen when the map information of the navigation device is displayed on the touch panel display 14 and changed from the map information picture, and the operating objects that comprise "DOOR", "DOOR LOCK", "DOOR MIRROR", "WINDOW GLASS" and "SEAT ADJUSTMENT" are displayed on a left-side display area in words and design to form an operating object selecting area "a", and an image "b" like the vehicle is displayed on a right-side display area.

Figure 4:
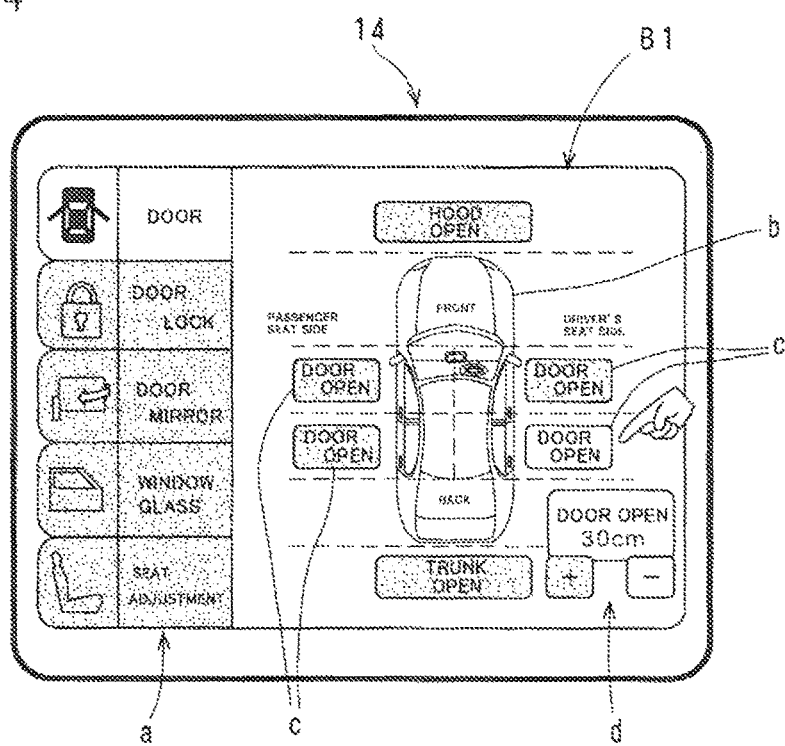
FIG. 4 is an operating object picture B1 on the touch panel display.

The operation object picture B1 in FIG. 4 is displayed when an operating object "DOOR" is touched in the operating object selecting area "a" of the initial picture "A" in the closed doors 2A-2D, trunk and hood. Displayed parts for "DOOR LOCK", "DOOR MIRROR", "WINDOW GLASS" and "SEAT ADJUSTMENT" in the operating object display area except "DOOR" get dark, and it can be made sure that the operating object for "DOOR" is selected.

A right-side displayed area of the operating object picture B1, besides the image "b", displays a displayed area "c" for "DOOR OPEN", "HOOD OPEN" and "TRUNK OPEN" on the doors 2A-2D, trunk lid 4 and hood 5 and an open adjusting area "d" for determining an opening of the door. In order to open any one of the doors 2A-2D, the displayed area "c" for "DOOR OPEN" for any one of the doors 2A-2D is touched; in order to open the trunk lid 4, the displayed area "c" for "TRUNK OPEN" for the trunk lid 4 is touched; and in order to open the hood 5, the displayed area "c" for "HOOD OPEN" for the hood 5 is touched.

In order to open any one of the doors 2A-2D In the operating object picture B1, a door open extent is determined with an opening adjusting area "d" displayed in the right display area before the displayed area "c" for "DOOR OPEN" on the door is touched. The door open extent is adjusted by touching and of the opening adjusting area "d" and changing a numerical value of the door open extent. By touching the displayed area "c" for "TRUNK OPEN", the trunk lid 4 can foe opened by controlling the trunk-lacking actuator 8. By touching the displayed area "c" for "HOOD OPEN", the hood 5 can be opened by controlling the hood-locking actuator 10.

The operating object picture B1 in FIG. 4 shows that the display area "c" for "DOOR OPEN" on the door 2C was touched.

Figure 5:
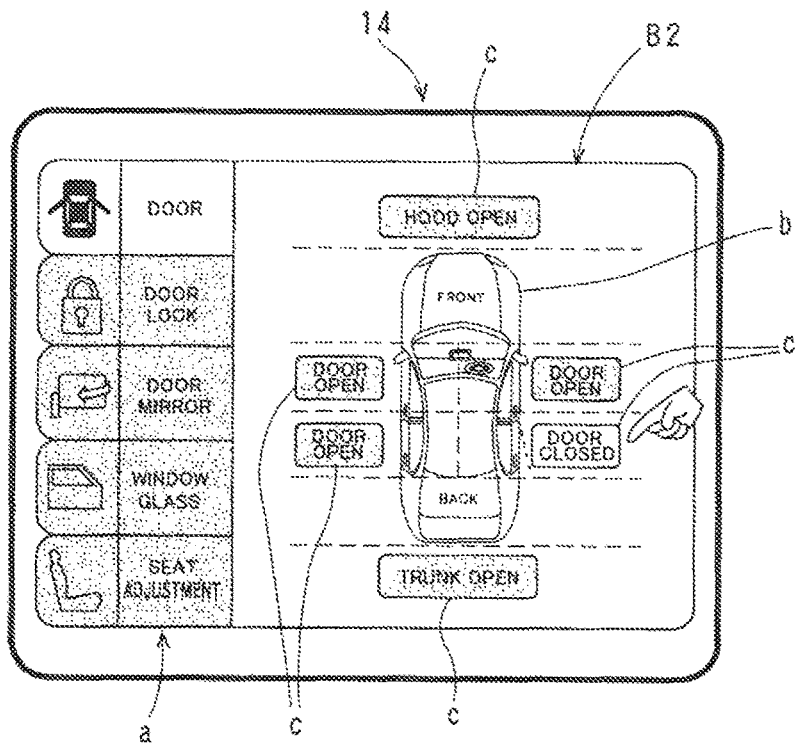
FIG. 5 is an operating object picture B2 on the touch panel display.

The operating object picture B2 in FIG. 5 shows that the operating object "DOOR" is touched on the operating object selecting area "a" in the initial picture when the door 2C of the doors 2A-2D is open, and as well as the operating object picture B1, the displayed portions "DOOR LOCK", "DOOR MIRROR", "WINDOW GLASS" and "SEAT ADJUSTMENT" of the operating object selecting area "a" except "DOOR" get dark.

On a right displayed area of the operating object picture B2, besides the image "b", the displayed parts "c" corresponding to the doors 2A-2D are displayed to show "DOOR OPEN" when the opening member is closed, and "DOOR CLOSED" when it is open.

FIG. 5 shows that the doors 2A, 2B, 2D are closed when the door 2C is open, in which the displayed part "c" on the door 2C shows "DOOR CLOSED", and the displayed parts "c" on the doors 2A, 2B, 2C show "DOOR OPEN". When the displayed part for "DOOR CLOSED" is touched, the door 2C is closed, and the open extent adjustment part "d" is not shown.

Figure 6:
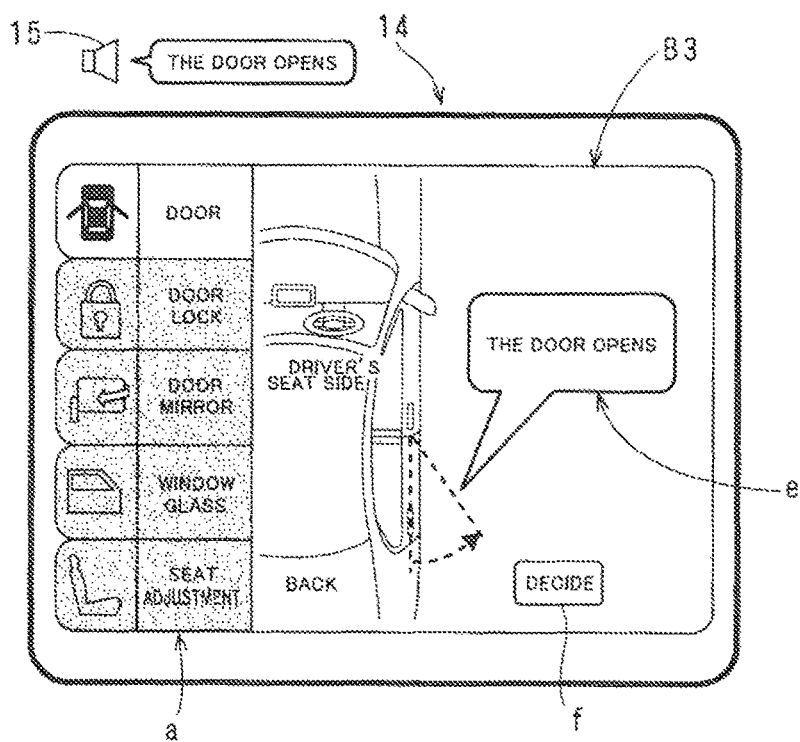
FIG. 6 is an operating object picture B3 on the touch panel display.

An operating object picture B3 in FIG. 6 is shown when the displayed part "c" on the door 2C in the operating object picture B1 is touched. At the right side of the operating object selecting area "a", an image like the selected door 2C is enlarged, and there are shown a notifying part "e" that informs you of a moving direction of the door 2C in words such as "The door opens" and a decision part "f" for determining a selected operation. When the decision part "f" is touched, a coordinate signal corresponding to a touched position is transmitted to the control device 17. The control device 17 starts opening control of the electric door opening device 6c for the door 2C based on a signal transmitted from the touch panel display 14 or a coordinate signal when the decision part "f" is touched.

Figure 7:
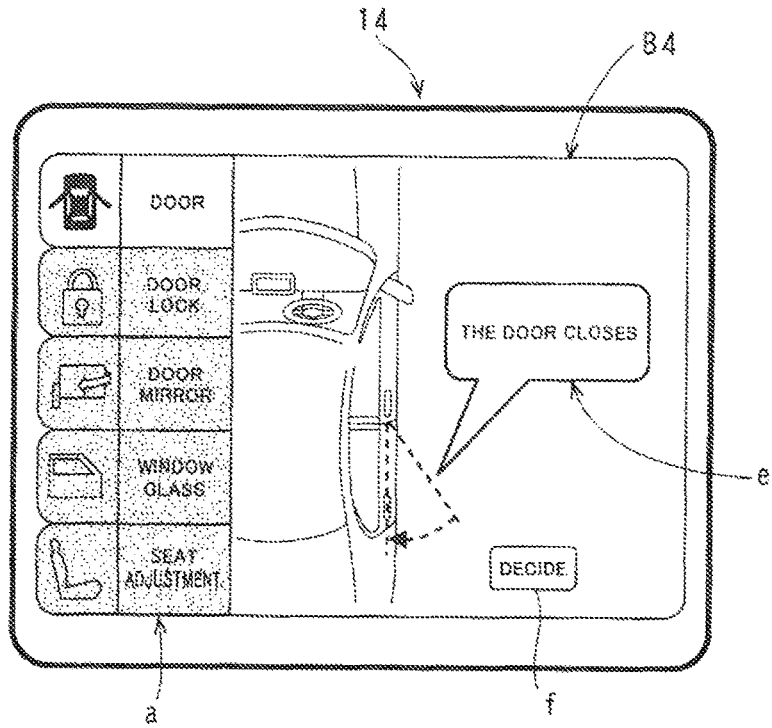
FIG. 7 is an operating object picture B4 on the touch panel display.

An operating object picture B4 in FIG. 7 is shown when the part "c" for the door 2C is selected on the operating object picture B2, an image like the selected door 2C is enlarged on a right side of the operating object selecting area "a", and the notifying part "e" shows word information such as "The door closes" showing a moving direction of the door 2C. The decision part "f" is touched, and the control device 17 starts closing control of the electric door opening device 6C for the door 2C.

Figure 8:
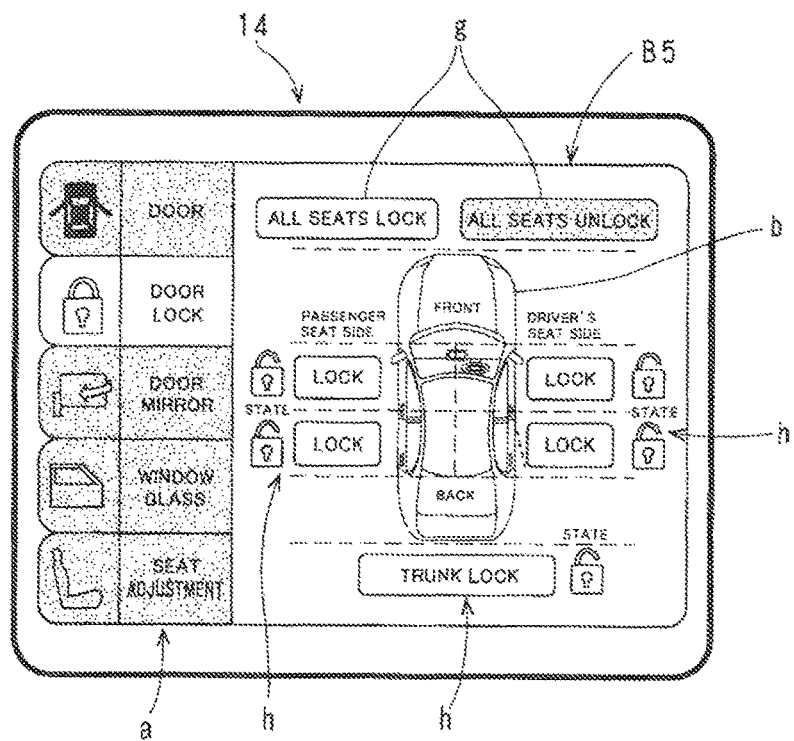
FIG. 8 is an operating object picture B5 on the touch panel display.

An operating object picture B5 in FIG. 8 is shown when the operating object "DOOR LOCK" of the operating object selecting area "a" is touched in the initial picture "A", and the displayed parts "DOOR", "DOOR MIRROR", "WINDOW GLASS" and "SEAT ADJUSTMENT" except "DOOR LOCK" on the operating object selecting area "a" get dark. Hence, it can be made sure that the operating object of the touch panel display 14 is "DOOR LOCK".

A right-side displayed area of an operating object picture B5 shows a selecting part "g" for selecting whether the door lock device carries out locking or unlocking and a state-showing portion "h" that suggests a state of each of the doors 2A-2D and trunk lid 4.

"All seat lock" or "all seat unlock" in a selection area "g" on the operating object picture B5 is touched, and a coordinate signal on the picture is transmitted to the control device 17. The control device 17 controls the door lock actuators 9A-9D based on a signal transmitted from the touch panel display 14 so that the door lock devices in the doors 2A-2D may be switched to a lock state or an unlock state.

On a state displaying area "h", a word information "UNLOCK" appears in a locked state, and a word information "LOCK" appears in an unlock state.

Figure 9:
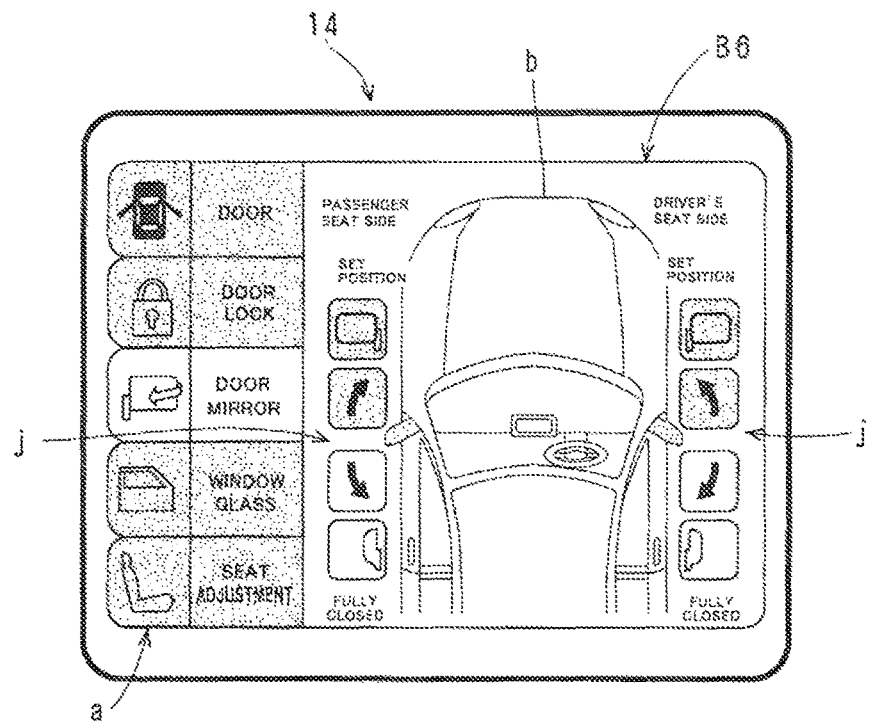
FIG. 9 is an operating object picture B6 on the touch panel display.

An operating object picture B6 in FIG. 9 displays that "DOOR MIRROR" is touched on the operating object selecting area "a" in the initial picture A. "DOOR", "DOOR LOCK", "WINDOW GLASS" and "SEAT ADJUSTMENT" except "DOOR MIRROR" on the operating object selecting area "a" get dark, thereby making sure that an operating object of the touch panel display 14 is "DOOR MIRROR".

On a right-side display area in the operating object picture B6, besides the image "b" like the vehicle, a selecting area "j" for operating a standing and folding motion and an angle adjustment of the door mirrors 11A, 11B of a mirror part is displayed. In the picture, in order to fold or stand the door mirrors 11A and 11B, parts for folding or standing are touched in the selection area "j". A bottom design part and a top design part are touched for folding and standing respectively. In order to adjust art angle of the mirrors, arrow parts in second and third stages are touched, and a coordinate signal in the picture is transmitted to the control device 17. The control device 17 controls the electric mirror devices 12A, 12B in a folding or standing direction or adjusts the angle of the mirror part based on a signal transmitted from the touch panel display 14.

Figure 10:
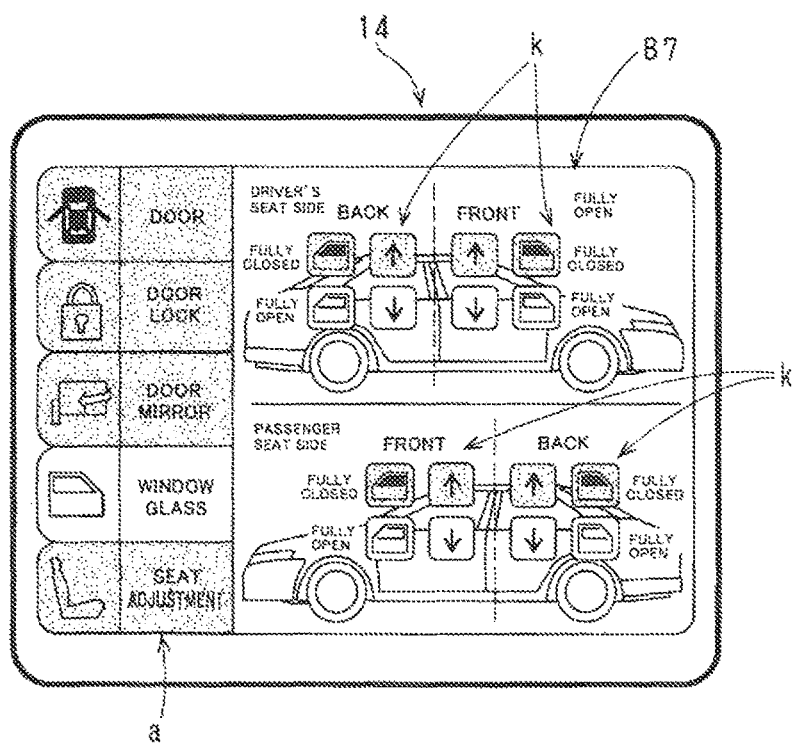
FIG. 10 is an operating object picture B7 on the touch panel display.

An operating object picture B7 in FIG. 10 is displayed by touching "WINDOW GLASS" on the operation object selection area "a" in the initial picture. "DOOR", "DOOR LOCK", "DOOR MIRROR" and "SEAT ADJUSTMENT" except "WINDOW GLASS" get dark, and it can be made sure that the operating object of the touch panel display is "WINDOW GLASS".

Besides the side views of the vehicle, a right-side display area shows selecting parts on the window glasses 3A-3D for selecting an operating direction.

In order to open the window glass 3A fully on the operating object picture B7, a design display part that suggests fully-open on the window glass 3A is touched on the selection area "k". In order to close the window glass 3A fully, a design display part for closing it fully is touched. In order to move it to open, a selecting part "↓" is touched. In order to move it to close, a part "↑" is touched. A coordinate signal in the picture is transmitted to the control device 17. The control device 17 controls the electric opening device 7A for the window glass 3A for opening and closing based on the signal from the touch panel display 14. In order to open or close any one of the window glasses 3B-3D except the window glass 3A, a part "k" for each of the window glasses 3B-3D is touched.

Figure 11:
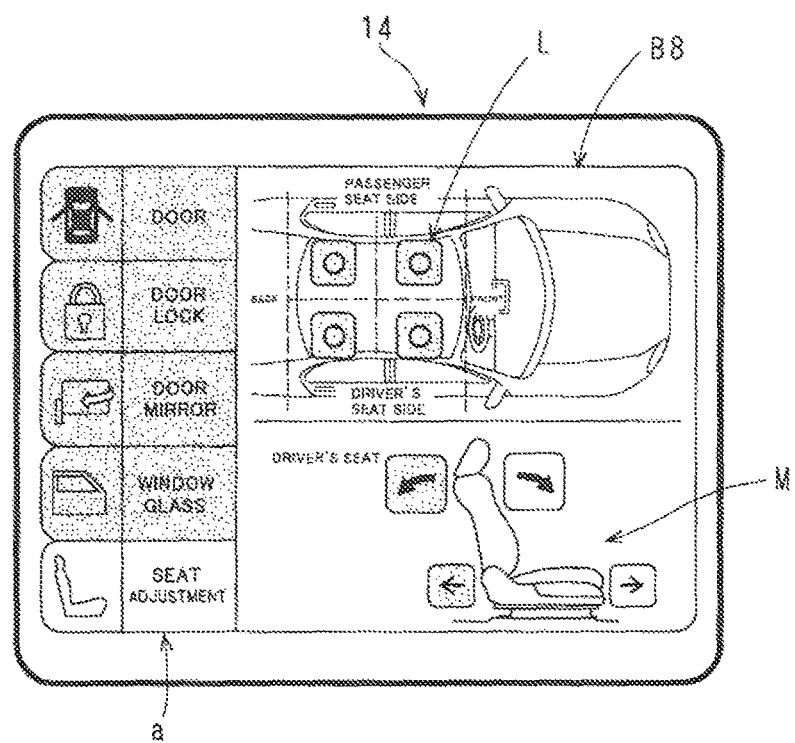
FIG. 11 is an operating object picture B8 on the touch panel display.

An operating object picture B8 in FIG. 11 is displayed when "SEAT ADJUSTMENT" on the operating object selection area in the initial picture A is touched. "DOOR", "DOOR LOCK", "DOOR MIRROR" and "WINDOW GLASS" except "SEAT ADJUSTING" in the operating object selection area "a" get dark. Hence, it can be made sure that the operating object for the touch panel display 14 is "SEAT ADJUSTMENT".

A right-side display region shows a selection area L that suggests front and rear seats besides an image like a part of the vehicle and a selection area M that suggests a direction of adjustment like the seat.

In order to adjust a driver's seat m the operating object picture B8, the seat is touched on the selection area L and an adjusting direction is touched on the selection area M. A coordinate signal on the screen is transmitted to the control device 17. The control device 17 controls the electric seat device 13 so as to adjust the selected seat based on the signal transmitted from the touch panel display 14.

Then, procedures for operating the object using the touch panel display 14 in this embodiment will be described with a flow chart in FIG. 12.

Figure 12:
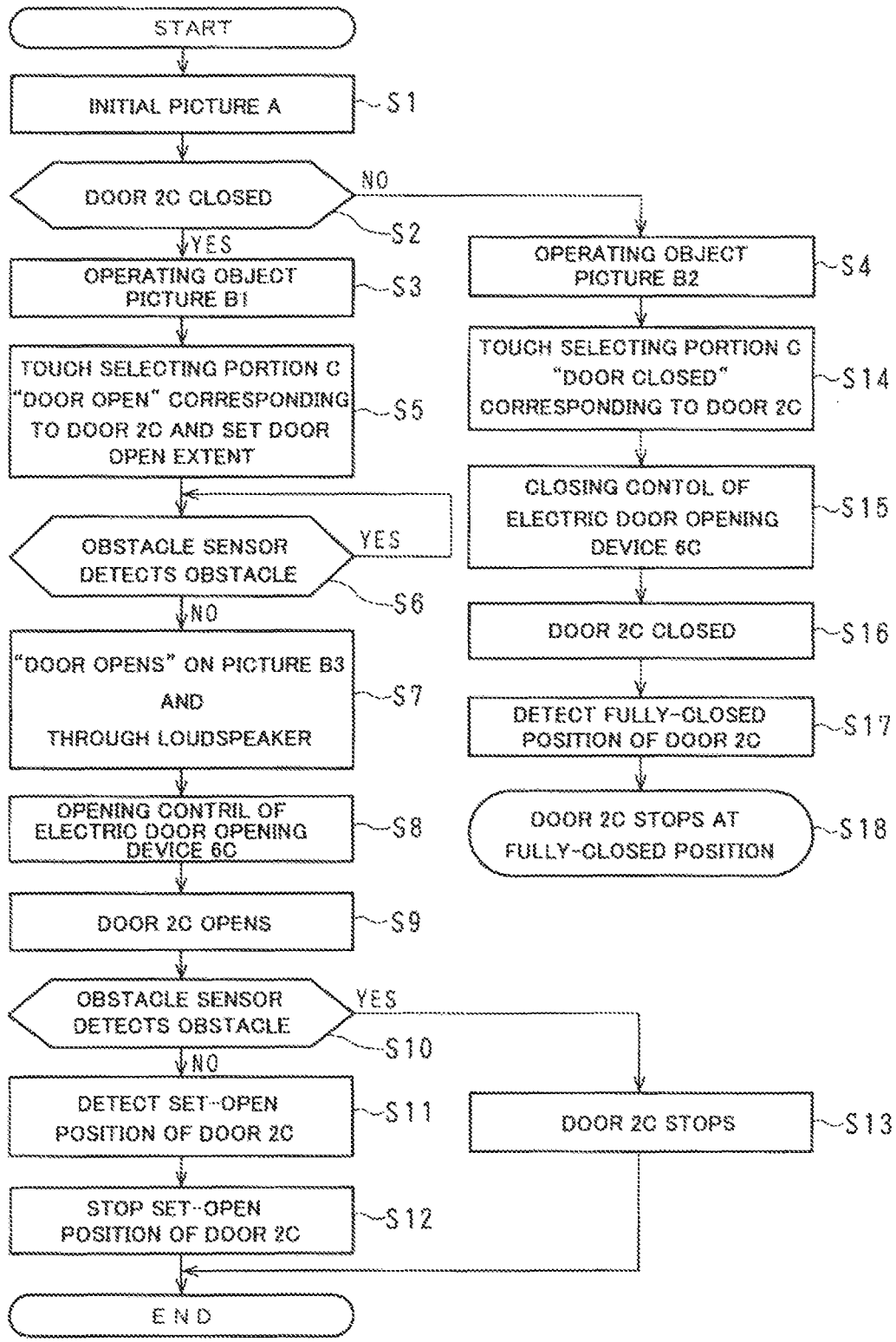
FIG. 12 is a flow chart showing control of an electric door opening device using the touch panel display.

The following description in FIG. 12 relates to the door 2C as the operating object, and can also be understood with respect to another door instead of the door 2C.

On the touch panel display 14 in which a map information of the navigation device is displayed, a certain display portion is touched, and the initial picture A in FIG. 3 is displayed on the touch panel display 14 as STEP S1.

"DOOR" is selected on the operating object selection area "a" in the initial picture A. With judgment in STEP S2, if it is determined that the door 2C is closed, it goes to STEP S3, and the operation object picture B1 in FIG. 4 is shown on the touch panel display 14. On the operating object picture B1, the area c for the door 2C shows that "DOOR OPEN", and "DOOR LOCK", "DOOR MIRROR", "WINDOW GLASS" and "SEAT ADJUSTMENT" except "DOOR" get dark on the operating object selecting area "a".

Then, the open extent adjusting portion "d" shown in the right-side operating object picture B1 is touched to adjust an open extent of the door, and then, the selection portion "c" for "DOOR OPEN" for the right-side door 2C of the plurality of selection portions "c" for "DOOR OPEN" is touched and determined in STEP S5.

If it is determined that the door 2C can be opened safely, by the judgment at a next step S8 or if the obstacle sensor 18 does not detect an obstacle in parking at ON of a parking range or at vehicle speed of less than 3 km/h, it goes to an operating object screen B3 In FIG. 6 and displays "DOOR OPENS" at a reporting part "e" of the touch panel display 14 to inform the user of alphabetic information that the door 2C opens.

Simultaneously with report of the alphabetic information displayed on the touch panel display, the control device 17 performs voice report control by which if is created through a voice that "RIGHT REAR DOOR OPENS" and informs a rear-seat passenger through the voice that the door 2C opens.

If the control device 17 determines that that the door 2C cannot securely be opened at the judgment process in the step S8 or if the obstacle sensor 18 detects an obstacle that the door 2C cannot be opened to make it impossible to get in or out of the vehicle or to make the vehicle run at speed over a predetermined speed, the report part "e" of the touch panel display 14 displays a message such as "THERE ARE AN OBSTACLE" or "STILL RUNNING" to inform one alphabetically that the door 2C cannot be opened and to make it impossible to open the door 2C owing to the electric door opening device 6C.

At the reporting process of the step S7, the user touches a determining portion f of the operating object screen B3 after one confirms safety, and a coordinate signal on the touched position or a door-opening signal is transmitted to the control device 17. The control device 17 drives and controls a releasing actuator (not shown) of the door 2C based on the door-opening signal from the touch panel display 14 and releases the door lock device of the door 2C, and then starts opening control for driving the electric door opening device 6C for the door 2C at a rotating amount corresponding a door-opening extent determined at an opening-extent adjusting portion "d" at the step S8.

The door 2C is opened at the step S9 by the electric door opening device 6C, and a pulse signal corresponding to an opening extent of the door 2C is transmitted to the control device 17 from an angular sensor of the electric door opening device 6C, Before the door 2C starts opening, the voice is formerly given from a loudspeaker 15 at the step S7 that the door 2C is opened, so that the door 2C can safely be opened without discomfort to the rear-seat passenger.

The control device 17 performs arithmetic calculation on the basis of the pulse signal transmitted from the angular sensor to find a moving direction and an opening position of the door 2C, so that image data for the opening position is transmitted to the touch panel display 14. Based on image data from the control device, the touch panel display 14 displays an animation on the operating object screen B3 as if a door image like the door 2C opens. Hence, the user can make sure on the touch panel display 14 that the door 2C opens.

If the obstacle sensor 18 does not detect an obstacle during opening of the door 2C in judgment of the step S10, the control device 17 compares a present door position calculated based on a pulse signal from the angular sensor with a predetermined open extent, and keeps door opening control if the present door position does not reach the predetermined open extent. The control device 17 stops the electric door opening device 6c if it is determined that the door reaches a predetermined open position at the step S11. Hence, the door 2C stops at the predetermined open position of the step S12.

If the obstacle sensor 18 detects an obstacle during judgment at the step S10, the electric door opening device 6C is controlled even before the door 2C reaches the predetermined open position, so that the door 2C is stopped just before the predetermined open position at the step S13.

If it is judged that the door 2C is open during the foregoing judgment in the step S2, it goes, to the step S4 in which an operating object picture B2 in FIG. 5 appears on the touch panel display 14. "DOOR CLOSED" appears on the word display "c" corresponding to the door 2C in the operating object picture B2.

"DOOR CLOSED" at a selecting portion "c" corresponding to the right rear door 2C on the operating object picture B2 is touched at the step 814, and a coordinate signal or a door closing signal for the operating object picture B3 is transmitted to the control device 17. The control device 17 receives the door closing signal from the touch panel display 14 and carries out closing control of the electric door opening device 6C corresponding to the door 2C at the step S15. Hence, the door 2C starts closing at the step S16, and a pulse signal with the number for an open extent of the door 2C is supplied from the angular sensor of the electric opening device 6C.

The control device 17 performs arithmetic calculation based on the information of the pulse signal transmitted from the angular sensor and calculates a moving direction and a door position of the door 2C to transmit image data corresponding to the door position to the touch panel display 14. Anytime, based on pictorial data from the control device 17, the touch panel display 14 displays an animation as if a door image like the door 2C is closed on the operating object picture B4. Hence, the user can make sure on the touch panel display 14 that the door 2C closes.

If the fully-closing switch defects that the door 2C is fully closed at the step S17, the control device 17 carries out stop control of the electric door opening device 6c. Thus, the door 2C stops at the fully-closed position at the step S18.

One embodiment of the present Invention is described as above, and without departing from claims, various modifications and changes may be made as below:

(a) The doors 2A-2D are sliding doors instead of the swinging doors.

(b) The touch panel display 14 is used only for the electric device.

(c) The touch panel display 14 is easily transportable.

What is claimed is:

1. A vehicle door control system comprising:
   multiple doors including front doors and rear doors each of which is supported to a vehicle body;
   multiple electric door opening devices each of which opens and closes each of the multiple doors electrically;
   a touch panel display that can display an image that suggests the multiple doors for selecting one of the doors;
   a loudspeaker for creating voice corresponding to information displayed on the touch panel display;
   multiple obstacle sensors provided corresponding to each of the multiple doors, each of which can detect an obstacle that prevents the door from opening;
   a control device that controls the electric door opening devices and the loudspeaker,
   wherein the touch panel display displays an image including an open adjusting area that adjusts an open extent of a selected door by touching,
   wherein before the control device performs a door opening control through which the selected door is opened by the electric door opening device by touching the image displayed on the touch panel display, the touch panel display displays a word information that suggests that the selected door opens before the control device performs the door opening control, and the control device performs voice notification control by which it is reported through the voice from the loudspeaker that the selected door opens, and
   wherein, if an obstacle sensor does not detect the obstacle after performing the voice notification control, the door opening control for opening the selected door is continued, and when the set open extent of the door is reached, the door opening operation for the selected door is stopped.

2. The vehicle door control system of claim 1, wherein the control device stops control of the electric door opening device even before the selected door reaches the open extent if the obstacle sensor detects the obstacle.

* * * * *